United States Patent
Botero Sierra et al.

(10) Patent No.: US 11,760,896 B2
(45) Date of Patent: Sep. 19, 2023

(54) WATER-BASED PEELABLE COATING

(71) Applicant: GLASST INNOVATION COMPANY S.A.S., Medellín (CO)

(72) Inventors: Juan Camilo Botero Sierra, Medellín (CO); Alexander Franco Castrillón, Sabaneta (CO)

(73) Assignee: GLASST INNOVATION COMPANY S.A.S., Medellin (CO)

( * ) Notice: Subject to any disclaimer, the term of this patent is extended or adjusted under 35 U.S.C. 154(b) by 95 days.

(21) Appl. No.: 17/478,999

(22) Filed: Sep. 20, 2021

(65) Prior Publication Data

US 2022/0243087 A1    Aug. 4, 2022

(30) Foreign Application Priority Data

Jan. 29, 2021    (CO) .................. NC2021/0001029

(51) Int. Cl.
| | | |
|---|---|---|
| *C09D 107/02* | (2006.01) | |
| *C09D 7/45* | (2018.01) | |
| *C09D 7/63* | (2018.01) | |
| *C09D 5/00* | (2006.01) | |

(52) U.S. Cl.
CPC ............ *C09D 107/02* (2013.01); *C09D 5/008* (2013.01); *C09D 7/45* (2018.01); *C09D 7/63* (2018.01)

(58) Field of Classification Search
CPC .......... C09D 107/02; C09D 7/45; C09D 7/63; C09D 5/008

USPC ......................................................... 524/493
See application file for complete search history.

(56) References Cited

U.S. PATENT DOCUMENTS

| | | | |
|---|---|---|---|
| 5,851,618 A | 12/1998 | Liddell et al. | |
| 2005/0250891 A1* | 11/2005 | Matuki | C08J 7/043 |
| | | | 524/430 |
| 2011/0097954 A1 | 4/2011 | Bone et al. | |
| 2013/0168018 A1 | 7/2013 | Casimiro et al. | |
| 2016/0319136 A1 | 11/2016 | Bone et al. | |

FOREIGN PATENT DOCUMENTS

| | | |
|---|---|---|
| CN | 101768403 A | 7/2010 |
| CN | 103555072 B | 3/2016 |
| JP | H09241541 A | 9/1997 |
| WO | 2006115550 A1 | 11/2006 |
| WO | 2011118792 A1 | 9/2011 |
| WO | 2013044289 A1 | 4/2013 |
| WO | 2013090341 A1 | 6/2013 |
| WO | 2016107744 A1 | 7/2016 |
| WO | 2017028196 A1 | 2/2017 |

* cited by examiner

*Primary Examiner* — Hui H Chin
(74) *Attorney, Agent, or Firm* — The Morales Law Firm; Joseph L. Morales

(57) ABSTRACT

The present disclosure develops a water-based peelable coating that can be colored and that when drying at room temperature makes it possible to temporarily protect various surfaces and their manufacturing processes. Notably, the present invention relates to a coating designed by using exclusively naturally occurring polymeric materials, which can be applied by various methods and be used outdoors or indoors on clear, rough and smooth substrates, except woven materials, so as to provide protection and beautification.

13 Claims, 4 Drawing Sheets

WATER-BASED PEELABLE COATING

CROSSREFERENCE TO RELATED APPLICATIONS

The present application claims the benefit, under 35 U.S.C. § 119(a), of Colombian Patent Application Serial No. NC2021/0001029 filed on Jan. 29, 2021, which is incorporated herein by reference in its entirety.

TECHNICAL FIELD

The present disclosure relates to the field of adhesive and peelable coatings and processes for manufacturing the same. Notably, the present invention refers to a peelable coating that employs water-based raw material that may be applied by various methods and suitable to be used both outdoors and indoors on different types of impervious, smooth or porous substrates. More specifically, the present invention relates to protectors, paints, and adhesive and peelable masking coatings.

BACKGROUND OF THE INVENTION

Today there is a wide variety of peelable coatings useful in various applications, such as preventing damage or scratches, performing demarcation processes, or providing protection and beautification to a surface against outdoor conditions. Generally, this type of coatings is based on synthetic polymers made from petrochemical sources whose main solvent is organic or aromatic in nature, among these are polymers such as acrylic resins, polyurethanes, or derivatives thereof, which are not biodegradable. Said coatings have limited applications, being mainly used on smooth non-porous surfaces such as glass and metal, which usually require a prior preparation and cleaning of the surface.

In addition, conventional peelable coatings, by being synthetic in nature, generate polluting residues, since they are not biodegradable, oxodegradable and/or compostable.

BRIEF DESCRIPTION OF THE INVENTION

The present invention relates to a water-peelable coating characterized by comprising from 10 to 90 wt % of partially cross-linked latex and from 0.15 to 3 wt % of a stabilizing system comprising mixtures of neutralizing amines and surfactants free from volatile organic compounds, where the partially cross-linked latex is obtained by contacting natural latex with a cross-linking system at a temperature from 25° C. to 90° C., from 30 minutes to 240 minutes, and where the peelable coating does not contain ammonia nor synthetic latex.

In addition, the present invention relates to a peelable paint further containing a dye, a pigment, or a mixture thereof and a masking coating used to protect surfaces when paint application is carried out.

DETAILED DESCRIPTION OF THE INVENTION

Figure 1:
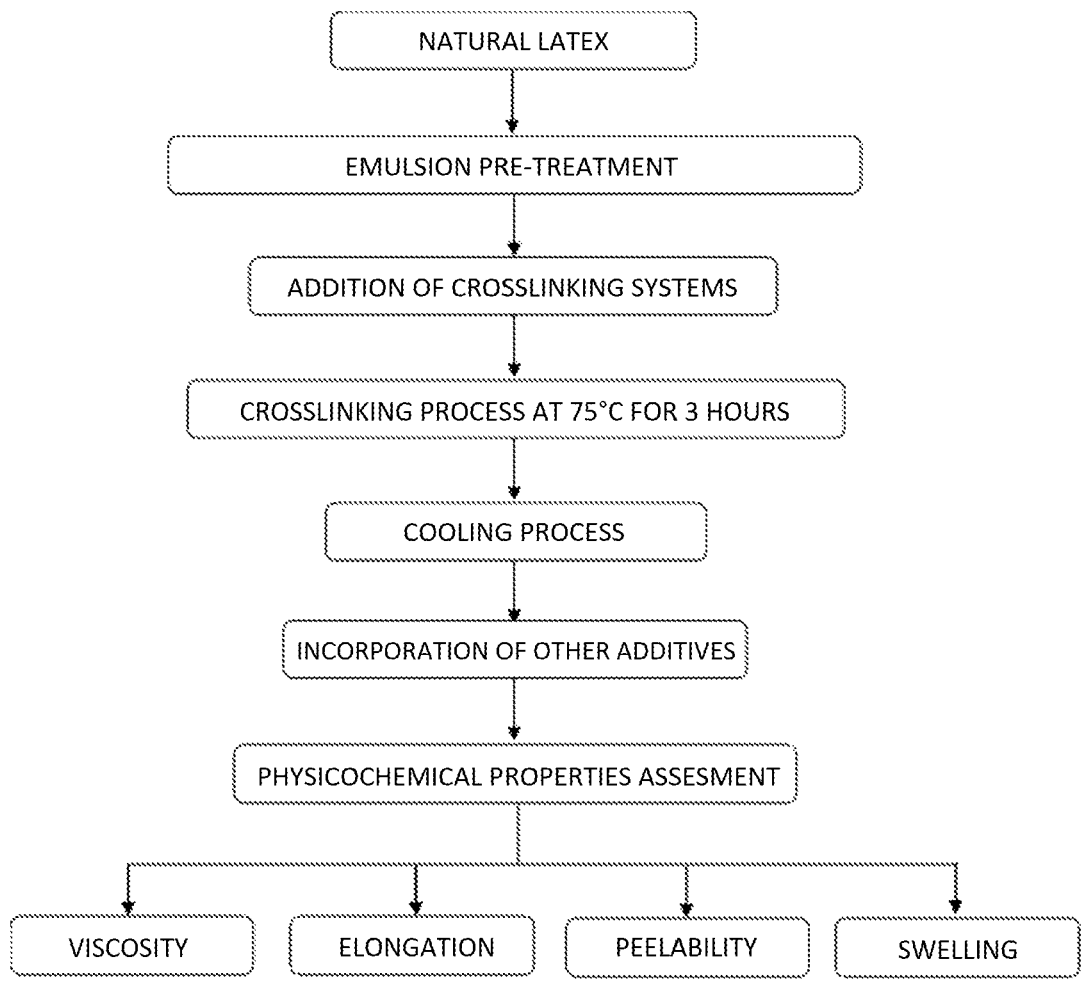
FIG. 1 corresponds to a flow diagram describing the process for the preparation of the partially cross-linked latex bases of Examples 1 to 4.

The water-based peelable coating of the present invention mainly comprises concentrated natural latex, which has been partially cross-linked. Partially cross-linked latex is obtained by contacting natural latex with a cross-linking system at a certain time and temperature.

The natural latex useful in the present invention is natural rubber latex, which is a stabilized colloidal dispersion of a polymeric substance (cis-1,4-polyisoprene) with a dry rubber content (DRC) of at least 60%. In one embodiment of the invention, the concentrated natural latex meets the ASTM D1076-15 specifications. The concentrated natural latex useful for the present invention may have an ammonia content between 0% and 0.7 wt %. In a particular embodiment, the peelable coating of the present invention comprises ammonia-free concentrated natural latex, which is obtained mainly by evaporation, centrifugation or cremation processes.

By reducing the amount of ammonia in the concentrated natural latex, a stabilizing system is added which comprises a neutralizing amine and a surfactant free of volatile organic compounds (VOCs). The stabilizing system is in an amount from 0.5 to 4, from 1 to 3.5, or from 1 to 3 parts per 100 parts of rubber (hereinafter phr). In one embodiment of the invention, the stabilizing system further comprises stabilizing agents such as boric acid and zinc oxide, among others.

Neutralizing amines suitable for the manufacture of the peelable coating of the present invention correspond to $C_3$-$C_{10}$ alkylamines optionally substituted with one or more hydroxyl substituents. In one embodiment of the invention the neutralizing amine is selected from the group consisting of dimethylamine, trimethylamine, ethylamine, propylamine, diethylamine, isopropylamine, butylamine, diisopropylamine, triethylamine, cyclohexylamine, dibutylamine, 2,2'-diaminodiethylamine, N'-[2-(2-aminoethylamino)ethyl] ethane-1,2-diamine, N'-[2-[2-(2-aminoethylamino)ethylamino]ethyl] ethane-1,2-diamine, ethanolamine commercially available as Falamine™ Plus from Altakem, n-methyl-ethanolamine, n-methyl-diethanolamine, isopropanolamine, 2-amino-2-methyl-1-propanol, diisopropanolamine, triethanolamine, (2R, 3R, 4R, 5S)-6-amino-hexane-1,2,3,4,5-pentol, (2R, 3R, 4R, 5S)-6-(dimethylamino) hexane-1,2,3,4,5-pentol commercially available as Genamin® Gluco 50 from Clariant or mixtures thereof. In a particular embodiment of the invention, the neutralizing amine is 2-amino-2-methyl-1-propanol, (2R, 3R,4R,5S)-6-(dimethylamino) hexane-1,2,3,4,5 -pentol or mixtures thereof. The amount of the neutralizing amine is from 0.2 to 3.9 phr, from 0.5 to 3 phr, or from 0.75 to 2 phr.

Useful surfactants for the manufacture of the peelable coating of the present invention correspond to fatty acid salts, modified ethoxylated fatty alcohols, polyethylene glycol esters, polyethylene glycol alkyl ethers, ethoxylated polyethylene glycol alkyl ethers, alkyl polyglycosides, sorbitan esters or mixtures thereof, among others. In the context of the present invention, the fatty acid salts are composed of C12 to C60 fatty acids and alkali metal cations such as sodium and potassium. Examples of fatty acid salts useful for the present invention correspond to sodium oleate, sodium caprylate, and sodium laurate. The amount of surfactant is from 0.1 to 1 phr, or from 0.2 to 0.8 phr.

In the context of the present invention, the crosslinking system comprises at least one crosslinking agent, a crosslinking accelerator, or mixtures thereof. The amount of the crosslinking system is from 0.5 to 10 parts per 100 parts of rubber (hereinafter phr).

The crosslinking agent is selected from the group consisting of organic peroxides such as diacyl peroxides, dialkyl peroxides, diterbutyl peroxides, sulfur suspensions, sulfur dispersions or mixtures thereof, elemental selenium, elemental tellurium, or mixtures thereof. Examples of the crosslinking agent used in the present invention include, but are not limited to, hydrogen peroxide, benzoyl peroxide, di(2,4-dichlorobenzoyl)peroxide, tert-butyl hydroperoxide (t-BuHP), 1,1-bis(tert-butylperoxy) 3,3,5-trimethyl cyclohexane, anionic sulfur suspensions with a solid content of at least 50% as commercially available under Octocure 456 from Tiarco Chemical, Mixland® S-80 GA F500 from Arkema, BOSTEX 378 from Akron Dispersions, Colloidal Sulfur 50% from Rhein Chemie, among others. The crosslinking agent is added in an amount from 0.2 to 4 phr, 0.3 to 4 phr, or 0.35 to 3.8 phr. In a particular embodiment, the crosslinking agent is added in an amount from 0.4 to 3.5 phr.

According to the present invention, the crosslinking accelerators can be selected from accelerators such as aldehyde, amines, guanidines, thiazoles, thiophosphates, sulfenamides, thioureas, dithiocarbamates, xanthates and mixtures thereof. Examples of crosslinking accelerators include, but are not limited to, hexamethylene tetramine (HMT), condensation products between heptaldehyde and aniline (HA) and butyrylaldehyde and aniline (BA), diphenylguanidine (DPG), N,N'-diortotolyl guanidine (DOTG), 2-mercaptobenzothiazole (MBT), 2,2'-dithiobis(benzothiazole) (MBTS), zinc 2-mercaptobenzothiazole (ZMBT), zinc O,O-di-butyl diphosphorodithioate (ZBDP), N-cyclohexyl-2-benzothiazolsulfenamide (CBS), N-tert-butyl-2-benzothiazolsulfenamide (TBBS), 2-(4-morpholinothio)-benzothiazole (MBS), N,N'-dicyclohexyl-2-benzothiazole sulfenamide (DCBS), ethylene thiourea (ETU), di-pentamethylene thiourea (DPTU), zinc dimethyldithiocarbamate (ZDMC), zinc diethyldithiocarbamate (ZDEC), zinc dibutyldithiocarbamate (ZDBC) commercially available as Octocure ZDB-50 from Tiarco Chemical or Vulmic ZDB from MICRO SA DE C.V., zinc dibenzyldithiocarbamate (ZDMC), zinc isopropyl xanthate (ZIX). The crosslinking accelerator is added in an amount from 0.2 to 5 phr. In a particular embodiment, the crosslinking accelerator is added in an amount from 0.4 to 3.5 phr.

According to the present invention, the ratio of the crosslinking accelerator to the crosslinking agent is from 0.1 to 12. In a particular embodiment, an efficient crosslinking system is used, wherein the ratio between the crosslinking accelerator and the crosslinking agent is from 1 to 12.

In one embodiment of the invention, an activator system is further used for the crosslinking process, which can be constituted by zinc oxide, zinc oxide with aluminum traces, stearic acid or mixtures of these for the case of crosslinking based on compounds of sulfur. In the case of crosslinking from peroxides, fructose, fructose with traces of iron (III), iron pyrophosphate or mixtures thereof are used as activator system. The addition of the activator system is made in amounts between 0.5 and 5 phr.

The partial crosslinking process of natural latex is conducted at a temperature from room temperature to 90° C., from 35° C. to 85° C., from 40° C. to 80° C. or from 45° C. to 75° C. during from 30 minutes to 240 minutes, from 60 minutes to 210 minutes, or from 90 minutes to 180 minutes. In a particular embodiment, the partial crosslinking process is conducted at a temperature from 40° C. to 80° C. and for a time from 120 minutes to 150 minutes. The time of the partial crosslinking process depends on the temperature at which the process is conducted, and the amount of the crosslinking system added. Likewise, resistance to environmental conditions, its level of biodegradability and level of adhesion on the applied substrate, are properties that will depend on all the previous factors, in addition to the incorporation of certain additives that reinforce the polymer obtained.

In one embodiment of the present invention, the stabilizing system can be added after the partial crosslinking process in an amount from 0.15 to 3 wt %, from 0.15 to 1.5 wt %, from 0.15 to 1 wt %, from 0.2 to 1 wt % or from 0.5 to 1 wt %, based on the total weight of the natural latex. The amount of neutralizing amine is from 0.1 to 2 wt %, based on the total weight of the peelable coating.

The peelable coating of the present invention may comprise an additional neutralizing agent in the stabilizing system that allows the pH of the final composition to be adjusted, and it is in an amount from 1 to 3 wt %, based on the total weight of the coating. Examples of the additional neutralizing agent include, but are not limited to, inorganic hydroxides selected from sodium hydroxide, potassium hydroxide, ammonium hydroxide, among others. In a particular embodiment, the additional neutralizing agent corresponds to potassium hydroxide.

The peelable coating of the present invention comprises from 10 to 90 wt %, from 20 to 80 wt %, or from 30 to 75 wt % of partially cross-linked latex with respect to the total weight of the coating.

The partially cross-linked latex according to the present invention has improved mechanical properties with respect to natural latex. For example, partially cross-linked latex has a percentage elongation greater than 400% measured according to ASTM D412, tear strength according to ASTM D624 and swelling greater than 75% according to ASTM D471, the improved adhesion tack measured according to ASTM D6195 or improved peel strength as measured according to ASTM D1876.

In order to maintain the biodegradable nature of the peelable coating of the present invention, no synthetic latex, of any kind, is included due to the low biodegradation of this sort of materials. Examples of synthetic latex include, but are not limited to, latex made from styrene monomers, styrene, maleic acid, acrylonitrile, 1,3-butadiene or chloroprene derivatives, emulsion rubbers: SSBR, SBS, SEBS, PBD, emulsion rubbers: SBR, NBR, other rubbers: EPDM, PVA, or mixtures thereof.

In one embodiment, the peelable coating of the present invention further comprises a coalescing agent. In the context of the present invention, a "coalescing agent" relates to a slowly evaporating solvent that helps forming a continuous film under ambient conditions. In a particular embodiment, the coalescing agent is selected from mixtures of ethyl, propyl, isopropyl diesters of mono or diacids. Examples of diesters include, but are not limited to, ethyl, propyl, isopropyl diesters derived from adipic acid, methylglutaric acid, ethylsuccinic acid, and mixtures thereof. The amount of the coalescing agent is from 1% to 2 wt %, based on the total weight of the peelable coating.

The peelable coating of the present invention may also contain a UV protective agent that can be selected from the group consisting of inorganic pigments such as $TiO_2$, UV absorbers from various technologies such as benzophenones, cyanoacrylates, benzotriazoles, triazines, oxanilides, as well as mixtures of low and high molecular weight hindered amines light stabilizers (HALS), which help protect the polymer against photo-degradation. Examples of benzotriazole UV protective agents include, but are not limited to, 2-(2'-hydroxy-5'-methylphenyl) benzotriazole (TINUVIN 1130), 2-(2'-hydroxy-5'-t-butylphenyl)benzotriazole, 2-(2'-hydroxy-3,5'-di-t-butylphenyl) benzotriazole, 2-(2-hydroxy-3'-t-butyl-5'-methylphenyl) benzotriazole, 2-(2'-hydroxy-3',5'-di-t-butylphenyl)-5-chlorobenzotriazole, 2-(2'-hydroxy-3', 5'-di-t-amylphenyl)benzotriazole, 2-[2'-hydroxyl-3'-(3",4",5",6"-tetrahydropythalimidoethyl) -5'-methylphenyl] benzotriazole and 2,2-methylenebis [4-(1,1, 3,3-tetramethylbutyl)-6-(2H-benzotriazole)phenol. Examples of HALS-type hindered bases are N, N', N", N'''-tetrakis (4,6-bis(butyl-(N-methyl-2,2,6,6-tetramethylpiperidin-4-yl)amino)triazin-2-yl)-4,7-diazadecane -1,10-diamine, 1,4-dimethyl ester of butanedioic acid, polymer with 4-hydroxy-2,2,6,6-tetramethyl-1-piperidineethanol. bis(2,2, 6,6-tetramethyl-4-piperidyl)sebacate, a mixture of 2-(2-hydroxphenyl) -benzotriazole with a hindered amine (TINUVIN 5151), ((bis (1,2,2,6,6-pentamethyl-4-piperidyl) sebacate+methyl (1,2,2,6,6-pentamethyl-4-piperidyl) sebacate, or mixtures thereof. The amount of the UV protection agent is from 0.1 to 10 wt %, based on the total weight of the peelable coating.

The peelable coating of the present invention may also contain an antioxidant, an anti-degradant or mixtures thereof, to mitigate or diminish the effects of aging due to extended storage, exposure to oxygen, heat, ultraviolet light, and catalytic degradation generated by presence of heavy metal ions (Cu, Mn, Fe, etc.), to dynamic fatigue and ozone exposure (static/dynamic/intermittent exposure). Examples of antioxidants include antioxidants of phenolic derivatives, such as p-phenylenediamine (PPDs), phosphate derivatives such as trimethylhydroquinones (TMQs), phenolic thioster derivatives, antioxidant amines such as alkylated diphenylamines (DPAs), multifunctional compounds such as aromatic phosphites and diphenyl amino ketone condensates or antioxidants of the benzimidazole type. Examples of the antioxidants are N,N' dialkyl p-phenylene diamine, N-alkyl-N'-aryl p-phenylene diamine and N, N' diaryl p-phenylene diamine. 2,6-di-t-butyl-4-methylphenol and 2,6-di -t-butyl-4-ethylphenol, 2'-methylenebis(4-methyl-t-butylphenol), 4'-thiobis (3-methyl-6-t-butylphenol); t-butylhydroquinone and 2,5-di-t-amylhydroquinone. Branched paraffin waxes, isoparaffins, microcrystalline paraffins, polyethylene and polypropylene waxes are used against the ozone attack at low and high temperatures. The content of antioxidants, antidegradants or mixtures thereof is from 0.1 to 5 wt % based on the total weight of the coating.

The peelable coating of the present invention may further contain a rheological modifier which is selected from the group consisting of inorganic, cellulosic, non-ionic synthetic polysaccharide and alkaline response modifiers. Examples of inorganic theological modifiers include attapulgites, bentonites, and fume silica. Examples of cellulosic rheology modifiers include hydroxyethyl cellulose (HEC), ethyl hydroxyethyl cellulose (EHEC), hydrophobically modified cellulose (HMHEC/HMEHEC), hydroxypropyl methylcellulose (HPMC). Examples of polysaccharide rheological modifiers include xanthan gum, alginates, and guar gum mixtures. Examples of non-ionic synthetic rheologic modifiers include modified ethoxylated urethanes, ether urethanes and HUER-type ethoxylated propoxylated urea. Examples of alkaline rheology modifiers include soluble and modified ASE/HASE-type emulsions. The amount of the rheological modifier within the present invention is from 0.1% to 0.6 wt %, based on the total weight of the peelable coating.

In one embodiment of the invention, the peelable coating is a removable architectural paint that also comprises a dye, a pigment, or mixtures thereof, which allows obtaining a wide variety of colors, from pastel colors to intense colors. In the context of the present invention, a "dye" and a "pigment" refer to substances that add color to the coating, the water-soluble dye and the pigment being a hydrophobic substance that requires a dispersant, humectant, or surfactant to be incorporated. The content of dye, pigment or mixtures thereof is from 1 to 10 wt % based on the total weight of the peelable coating.

In one embodiment of the invention, the peelable coating is a maskant used for protecting surfaces when paint application is carried out. The maskant according to the present invention further comprising a mixture of cellulosic rheological modifiers, inorganic fillers, defoamers, a dye, a pigment, or mixtures thereof.

Suitable fillers for the preparation of any of the previous embodiments are selected from the group consisting of precipitated silicas, sodium montmorillonite clays, polysiloxanes, natural or calcined kaolinites, talcs, natural cellulose fibers, calcium carbonate, their nanometric dispersions and mixtures thereof. The addition of fillers to the cross-linked polymer allows to improve the processability, drying times, tack, blocking, increase or decrease the gloss and cost reduction.

In addition to the components mentioned above, the peelable coating of the present invention may comprise one or more of the following additives: dispersants, humectants, fungicides, biocides, antioxidants, plasticizers, grinding aids, defoamers, leveling additives, among others. Such additives may be present in a total amount from 0 to 5wt %, or from 0.01 to 2 wt %, based on the total weight of the peelable coating or from 0.0001 to 0.5 phr.

The peelable coating of the present invention has adequate resistance properties to be used outdoors with an outdoor duration of up to six months before beginning its deterioration process. Additionally, the coating of the present invention has good peeling properties after being applied onto a surface, where minimal or no mass transfer can be observed. In embodiments comprising a dye, pigment, or mixtures thereof, minimal or no color transfer is observed after the coating is applied. The peelable coating of the present invention may be applied again onto any surface to extend its protection period.

The method of applying the peelable coating of the invention comprises the steps of removing oils and greases on the surface, applying the coating on a surface or substrate and drying. The surface where the protector is to be applied does not require any further treatment. The peelable coating of the present invention can be applied by various types of methods including, but not limited to, brushing, rolling, dipping, or spraying.

Advantageously, the present invention can be applied by means of any spraying equipment, such as, application by means of high pressure and low volume atomizers (HPLV), pressure or airless atomizers (airless gun).

The peelable coating of the present invention may be applied to different types of substrates. Examples of suitable substrates include smooth, porous or highly rough surfaces such as glass, concrete, marble, porcelain, metal, veneered or exposed wood, walls with water-based or solvent-based coatings, leather, plastics, among others, except natural or synthetic fiber fabrics and absorbent materials, maintaining their peeling ability.

The peelable coating of the present invention has enhanced properties over conventional coatings, such as it is resistant to washing with undiluted strong acids or bases such as nitric acid, hydrochloric acid, sodium and potassium hydroxide, less hydrofluoric acid and products commonly used for washing exterior facades such as Rinse by Sika (mixture of methanesulfonic acid and C12-C14 ethoxylated alcohols), degreasing cleaner 719W by Sika (mixture of non-ionic surfactants, silicates, phosphonates), Eucocleaner LR by Toxement (mixture of polymers of exchange, polyfunctional sequestrants, cationic modifiers, nitric acid), among others. In addition, the coating of the present invention, as it is made of natural materials, is inexpensive compared to similar products; it has resistance to direct spark generated by welding processes without producing combustion, and it has resistance to temperatures below 0° C. An additional benfit of the peelable coating described in the present application is that it is biodegradable, compostable and oxodegradable.

EXAMPLES

The examples below correspond to particular embodiments of the present development, and they are not intended to limit the scope of protection.

Example 1 Obtaining of partially cross-linked natural latex bases.

For the preparation of Examples 1 to 4, which correspond to the base of the partially cross-linked polymer of the invention, one or more of the stages outlined in Figure A are included and are based on the compositions of Table 1. Properties such as viscosity, elongation, peelability, and swelling percent were measured using adaptations of ASTM D471, D4878, D412, D624, D1876, D6195.

TABLE 1

|  | Example 1 (phr) | Example 2 (phr) | Example 3 (phr) | Example 4 (phr) |
|---|---|---|---|---|
| Natural latex | 100 | 100 | 100 | 100 |
| Stabilizing system (1) | 1.00 | 1.50 | 2.20 | 1.00 |
| Amine (2) | 0.50 | 0.75 | 1.00 | 0.50 |
| Crosslinking agent (3) | 0.40 | 1.70 | 3.50 |  |
| Crosslinking accelerator (4) | 0.40 | 1.70 | 3.00 |  |
| Activator system (5) | 1.00 | 2.50 | 5.00 |  |
| Surfactant (6) | 0.20 | 0.40 | 0.60 |  |
| Hydroperoxide (7) |  |  |  | 0.90 |
| Fructose (8) |  |  |  | 1.00 |
| Biocide (9) | 0.001 | 0.001 | 0.001 | 0.001 |
| Defoamer (10) | 0.001 | 0.001 | 0.001 | 0.001 |
| Viscosity (cP at 25° C.) | 320 | 480 | 530 | 480 |
| Elongation at break (%) | 920 | 880 | 850 | 780 |
| Peelability (11) | A | A | B | A |
| Swelling percentage | 86 | 80 | 75 | 88 |

(1) Stabilizing system: comprised of a mixture of an inorganic hydroxide, Triethanolamine (TEA), Lauryl ether sulfate
(2) ethanolamine (FalamineTM)
(3) Sulfur dispersion
(4) 2-mercaptobenzothiazole (MBT)
(5) Zinc oxide dispersion with aluminum traces
(6) Emulsogen LCN 407 (alkyl esters of polyethylene glycol with 40 moles of ethylene oxide)
(7) 70% terbutyl hydroperoxide.
(8) 20% fructose
(9) Nipacide BSM A (Mixture of 2-methyl-4hydrothiazol-3-one (MIT) and 1,2-benzoisothiazol-3 (2H)-one (BIT)).
(10) DEE FO 1015 (mixture of waxes and petroleum distillates)
(11) A: Very good; B: Good; C: Deficient Example 2 Obtaining of peelable protecting coatings.

Figure 2:
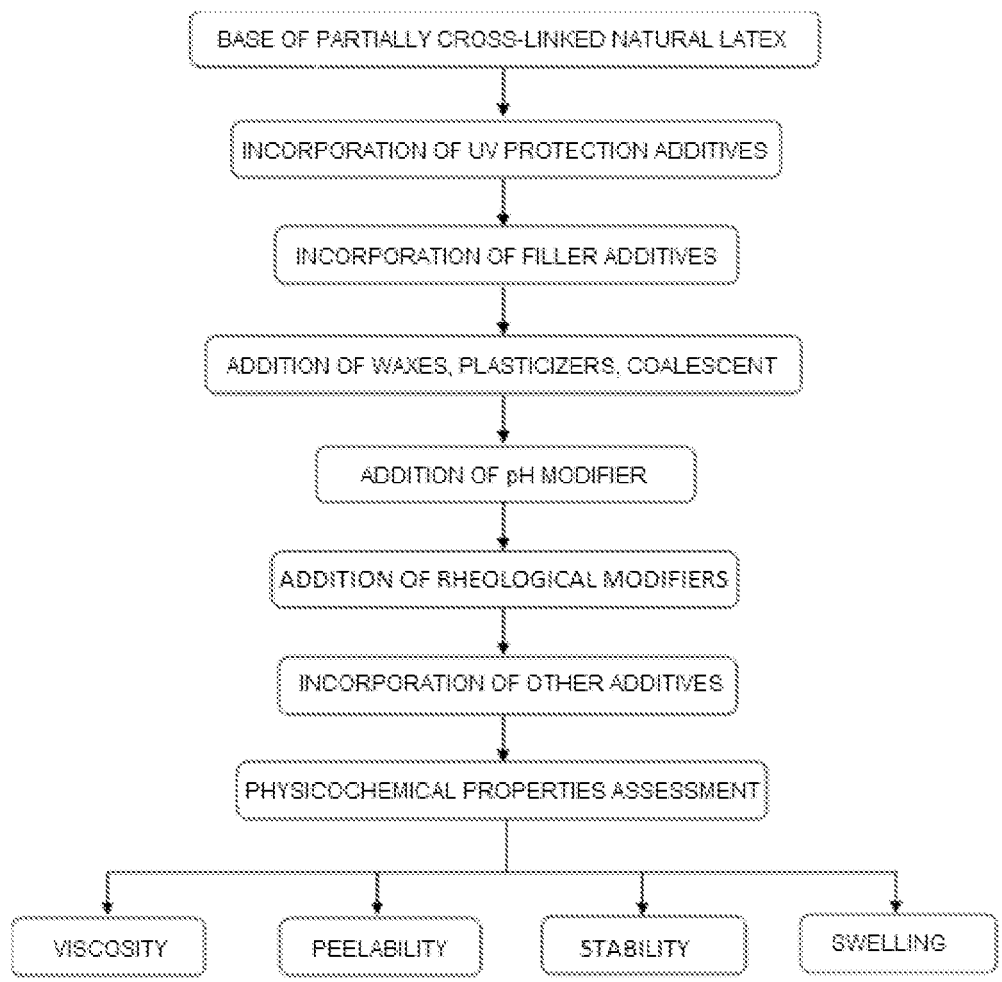
FIG. 2 corresponds to a flow diagram describing the process for the preparation of the peelable protectors of Examples 5 and 6.

The preparation of peelable protecting coatings (Examples 5 and 6) is carried out according to the outlined stages in FIG. 2, and it is based on the compositions in Table 2. Properties such as viscosity, elongation, peelability, and swelling percent were measured using adaptations of ASTM D471, D4878, D412, D624, D1876, D6195.

TABLE 2

|  | Example 5 (%) | Example 6 (%) |
|---|---|---|
| Base Example 1 | 64.80 | 71.00 |
| TiO2 | — | 5.00 |
| Filler 1 (1) | — | 15.48 |
| Filler 2 (2) | 26.18 | — |
| UV Protectors (3) | 0.50 | 0.50 |
| HALS-type Protectors (4) | 0.20 | 0.50 |
| Plasticizer (5) | 3.00 | 2.00 |
| Amine (6) | 0.50 | 1.00 |
| Coalescent (7) | 1.00 | 2.00 |
| Wax (8) | 3.00 | 2.00 |
| Rheological modifiers (9) | 0.80 | 0.50 |
| Biocide (10) | 0.01 | 0.01 |
| Defoamer (11) | 0.01 | 0.01 |
| Viscosity (cP at 25° C.) | 3700 | 4500 |
| Elongation at break (%) | 850 | 815 |
| Peelability (12) | A | A |
| Swelling percentage | 80 | 78 |

(1) Calcium carbonate dispersion
(2) Natural kaolin dispersion
(3) Tinuvin mixture 5151/5060 (mixture of 2-(2-hydroxphenyl)-benzotriazole with hindered amines)
(4) Tinuvin XT 55 (hindered amine derivatives)
(5) dibutyl adipate
(6) Falamine Plus (ethanolamine)
(7) Texanol
(8) Octowax 1500 (mixture of paraffin and microcrystalline wax)
(9) 2% Hydroxypropyl Cellulose Mixture
(10) Nipacide BSM A (Mixture of 2-methyl-4hydrothiazol-3-one (MIT) and 1,2-benzo-isothiazol-3 (2H)-one (BIT)).
(11) DEE FO 1015 (mixture of waxes and petroleum distillates)
(12) A: Very good; B: Good; C: Deficient Example 3 Obtaining of peelable paints.

Figure 3:
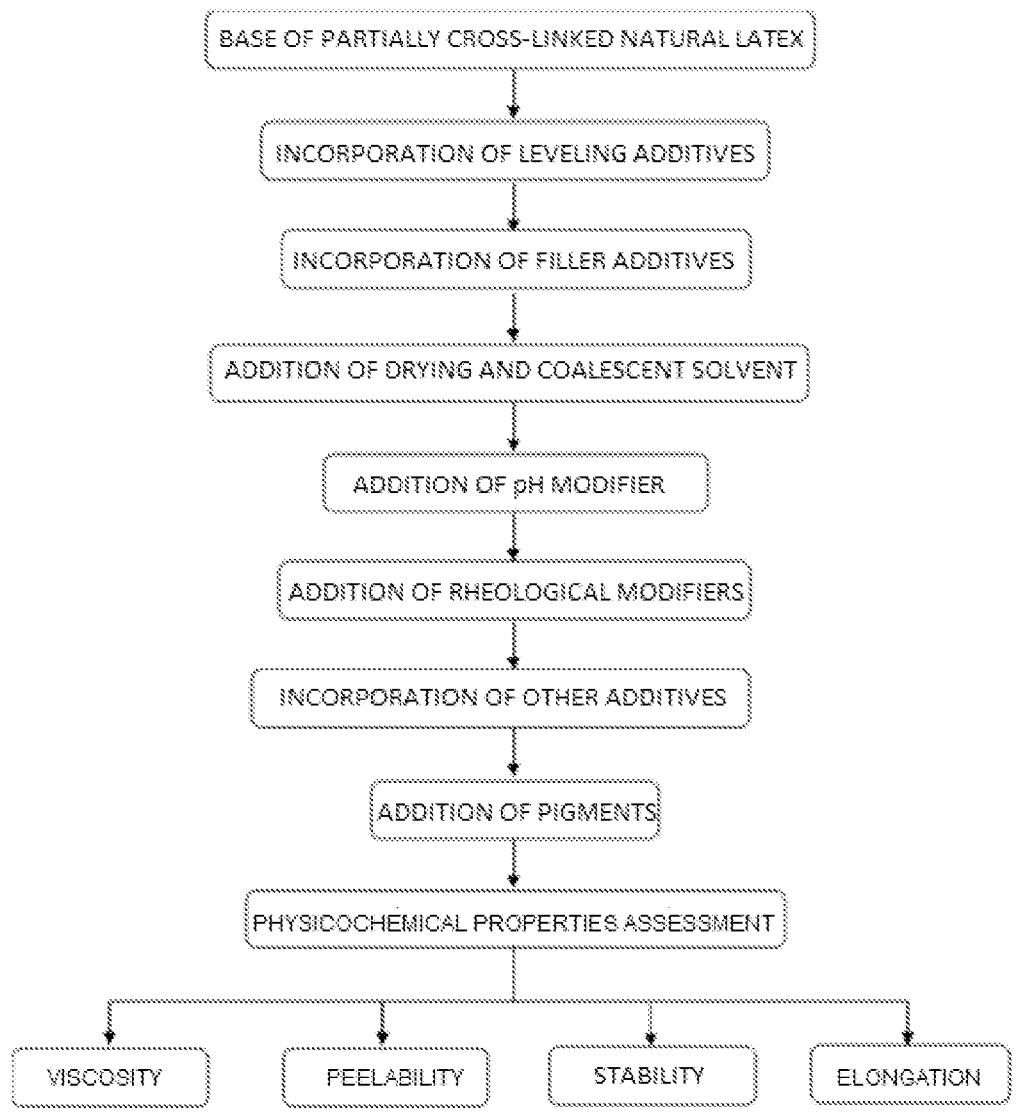
FIG. 3 corresponds to a flow diagram describing the process for the preparation of the peelable paints of Examples 7 and 8.

The preparation of peelable paintings (Examples 6 and 7) is carried out according to the outlined stages in FIG. 3, and it is based on the compositions in Table 3. Properties such as viscosity, elongation, peelability, and swelling percent were measured using adaptations of ASTM D471, D4878, D412, D624, D1876, D6195.

TABLE 3

|  | Example 7 (%) | Example 8 (%) |
|---|---|---|
| Base Example 1 (A) | 60.00 | 70.00 |
| Amine 1 (1) | 0.50 | 0.80 |
| Amine 2 (2) | 0.80 | 0.50 |
| Coalescents (3) | 1.00 | 0.30 |
| Drying solvents (4) | 0.10 | 0.80 |
| Fillers (5) | 19.00 | 9.70 |
| Leveling additives (6) | 0.50 | 0.50 |
| Polysiloxane resin (7) | 7.60 | 4.00 |
| Dye dispersion (8) | 8.00 | 8.00 |
| Rheological modifiers (9) | 0.50 | 0.40 |
| TiO2 | 0.00 | 5.00 |
| Siliceous Earth (10) | 2.00 | 0.00 |
| Biocide (11) | 0.01 | 0.01 |
| Defoamer (12) | 0.02 | 0.02 |
| Viscosity (cP at 25° C.) | 3300 | 3800 |
| Elongation at break (%) | 890 | 910 |
| Peelability (13) | A | A |
| Swelling percentage | 88 | 83 |

(1) Triethanolamine

TABLE 3-continued

| | Example 7 (%) | Example 8 (%) |
|---|---|---|
| (2) Ethanolamine | | |
| (3) Texanol. | | |
| (4) Methyl acetate | | |
| (5) calcined kaolin | | |
| (6) Acrysol RM 5000 (hydrophobically modified polyethylene oxide urethane) | | |
| (7) Tego Phobe 6600 (emulsion of a polysiloxane resin and a silane mixture) | | |
| (8) 35% Phthalocyanine Green Dispersion. | | |
| (9) Natrosol 250 (hydroxyethylcellulose) 3% | | |
| (10) Cab-O-Sil. | | |
| (11) Nipacide BSM A (Mixture of 2-methyl-4hydrothiazol-3-one (MIT) and 1,2-benzo-isothiazol-3(2H)-one (BIT)). | | |
| (12) DEE FO 1015 (mixture of waxes and petroleum distillates) | | |
| (13) A: Very good; B: Good; C: Deficient | | |

Example 4 Obtaining of peelable masking coatings.

Figure 4:
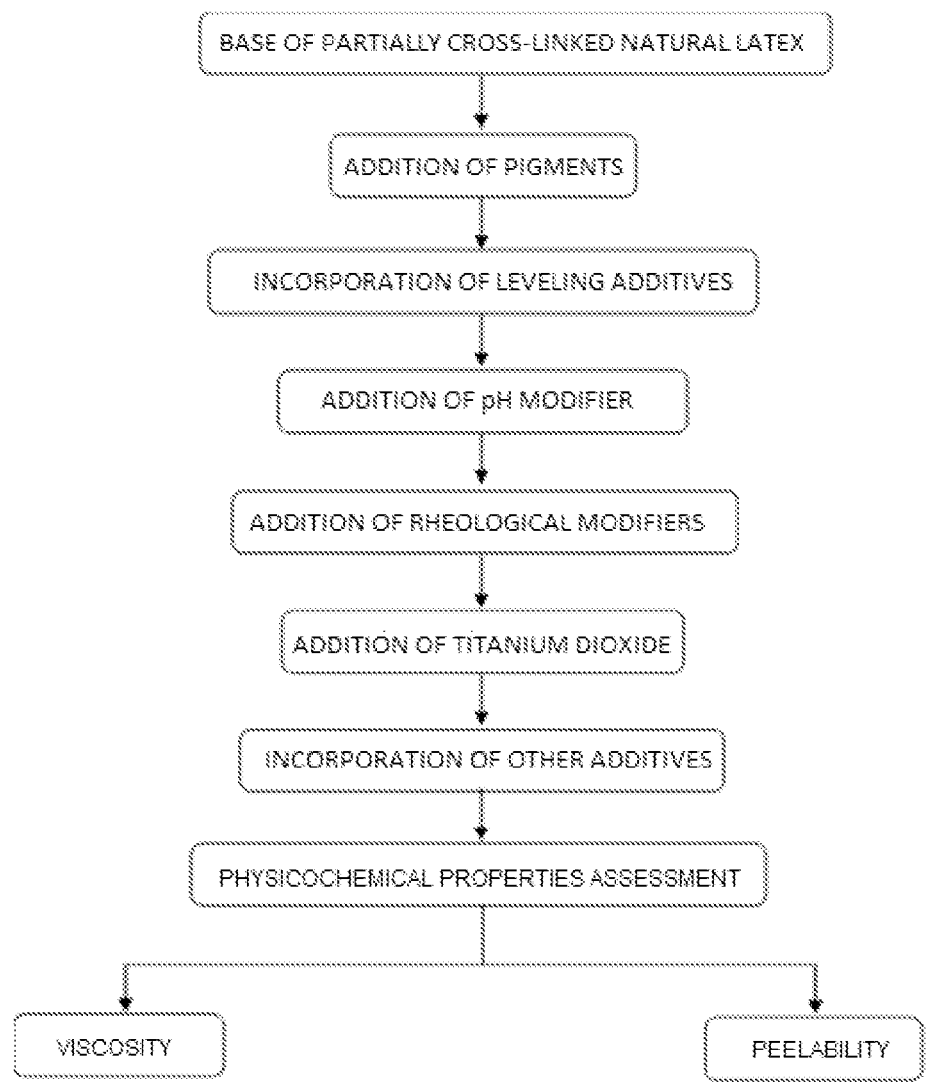
FIG. 4 corresponds to a flow diagram describing the process for the preparation of the peelable masking coatings of Examples 9 and 10.

The preparation of peelable masking coatings (Examples 9 and 10) is carried out according to diagram in FIG. 4, and it is based on the compositions in Table 4. Viscosity and peelability are measured according to ASTM D4878 and D1876.

TABLE 4

| | Example 9 (%) | Example 10 (%) |
|---|---|---|
| Base Example 1 | 89 | 86 |
| Pigment dispersion (1) | 1 | 1 |
| Rheological additives (2) | 0.5 | 0.5 |
| Leveling additives (3) | 0.2 | 0.2 |
| TiO2 | 5 | 7 |
| Filler (4) | 4 | 5 |
| Defoamer (5) | 0.3 | 0.3 |
| Viscosity (cP at 25° C.) | 5500 | 4800 |
| Peelability (6) | A | B |

(1) Dispersion NOVOPERM ®YELLOW F2G-EDS1
(2) Natrosol 250 HB (hydroxyethylcellulose) 3%
(3) Acrysol RM 5000 (hydrophobically modified polyethylene oxide urethane)
(4) Calcium Carbonate
(5) DEE FO 1015 (mixture of waxes and petroleum distillates)
(6) A: Very good; B: Good; C: Deficient

What is claimed is:

1. A water-based peelable coating comprising:
   from 10 to 90 wt % of partially cross-linked latex; and
   from 0.15 to 3 wt % of a stabilizing system, based on the total weight of the peelable coating,
   wherein the stabilizing system comprises at least one neutralizing amine and at least one surfactant, and the stabilizing system is free from volatile organic compounds,
   wherein the partially cross-linked latex is obtained by contacting natural latex with a crosslinking system, at a temperature from 25° C. to 90° C., during from 30 minutes to 240 minutes, and
   wherein the peelable coating does not contain ammonia nor synthetic latex.

2. The peelable coating according to claim 1, wherein the neutralizing amine is a $C_3$-$C_{10}$ alkylamine optionally substituted with one or more hydroxyl substituents, and it is in an amount from 0.1 to 2 wt %, based on the total weight of the peelable coating.

3. The peelable coating according to claim 1, wherein the amount of the crosslinking system is from 0.5 to 10 phr.

4. The peelable coating according to claim 1, wherein the crosslinking system comprises a crosslinking agent selected from the group consisting of organic peroxides, sulfur suspensions, sulfur dispersions, and mixtures thereof.

5. The peelable coating according to claim 1, wherein the crosslinking system further comprises a crosslinking accelerator selected from the group consisting of aldehyde, amines, guanidines, thiazoles, thiophosphates, sulfenamides, thioureas, dithiocarbamates, xanthates accelerators, and mixtures thereof.

6. The peelable coating according to claim 1, further comprising from 1% to 2 wt %, based on the total weight of the peelable coating, of a coalescent agent having a low volatile organic compounds content selected from the group consisting of ethyl, propyl, isopropyl diesters of mono or diacids, and mixtures thereof.

7. The peelable coating according to claim 6, wherein the coalescent agent is selected from the group consisting of ethyl, propyl, isopropyl diesters derived from adipic acid, methylglutaric acid, ethylsuccinic acid, and mixtures thereof.

8. The peelable coating according to claim 1, further comprising from 1% to 10 wt %, based on the total weight of the peelable coating, of a dye, a pigment, or mixtures thereof.

9. The peelable coating according to claim 1, wherein the surfactant is selected from the group consisting of fatty acid salts, modified ethoxylated fatty alcohols, polyethylene glycol esters, polyethylene glycol alkyl ethers, ethoxylated polyethylene glycol alkyl ethers, alkyl polyglycosides, sorbitan esters, and mixtures thereof.

10. The peelable coating according to claim 1, wherein stabilizing system comprises an additional neutralizing agent selected from inorganic hydroxides.

11. The peelable coating according to claim 4, wherein the crosslinking agent is selected from organic peroxides, and the crosslinking system also comprises an activator system selected from the group consisting of fructose, fructose with traces of iron (III), iron pyrophosphate, and mixtures thereof.

12. The peelable coating according to claim 4, wherein the crosslinking agent is selected from sulfur suspensions, sulfur dispersions, and mixtures thereof, and the crosslinking system also comprises an activator system selected from the group consisting of zinc oxide, zinc oxide with aluminum traces, stearic acid, and mixtures thereof.

13. The peelable coating according to claim 1, further comprising one or more additives selected from the group consisting of UV protective agents, antioxidants, antidegradants, rheological modifiers, fillers, dispersants, humectants, fungicides, biocides, plasticizers, grinding aids, defoamers, leveling additives, and mixtures thereof.

\* \* \* \* \*